United States Patent
Ade et al.

(10) Patent No.: US 6,199,438 B1
(45) Date of Patent: Mar. 13, 2001

(54) DRIVE DEVICE FOR A WINDSCREEN WIPER

(75) Inventors: Rolf Ade, Bietigheim-Bissingen; Hubert Scheele, Weinsberg; Bernd Walther; Martin Csermak, both of Bietigheim-Bissingen, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/101,067
(22) PCT Filed: Dec. 4, 1996
(86) PCT No.: PCT/EP96/05403
§ 371 Date: Nov. 20, 1998
§ 102(e) Date: Nov. 20, 1998
(87) PCT Pub. No.: WO97/24245
PCT Pub. Date: Jul. 10, 1997

(30) Foreign Application Priority Data

Dec. 27, 1995 (DE) .............................................. 195 48 824

(51) Int. Cl.$^7$ .................................................. F16H 21/16
(52) U.S. Cl. ............................. 74/25; 74/425; 15/250.16
(58) Field of Search .................. 74/425, 471 R, 74/469, 25; 15/250.16, 250.17

(56) References Cited

U.S. PATENT DOCUMENTS

| | | | |
|---|---|---|---|
| 3,717,048 | * | 2/1973 | Carpenter ................................ 74/600 |
| 4,924,726 | * | 5/1990 | Rogakos et al. ........................ 74/600 |
| 5,566,577 | * | 10/1996 | Klar .......................................... 74/42 |
| 5,953,786 | * | 9/1999 | Maue et al. ......................... 15/250.01 |

FOREIGN PATENT DOCUMENTS

| | | |
|---|---|---|
| 3607891 | 11/1986 | (DE) . |
| 3837758 | 5/1989 | (DE) . |
| 0359227 | 3/1990 | (EP) . |
| 0521528 | 1/1993 | (EP) . |
| 2698942 | 6/1994 | (FR) . |
| 2175493 | 12/1986 | (GB) . |

OTHER PUBLICATIONS

Search Report of the German Patent Office Relating to Parent German Patent Application No. 195 48 824.5 dated May 29, 1996.
German Patent Application No. G 85 22 476.6 dated Nov 7, 1985.
Japanese Patent Abstract for Application No. 64–202392 dated Mar. 22, 1991.

* cited by examiner

Primary Examiner—David M. Fenstermacher
(74) Attorney, Agent, or Firm—J. Gordon Lewis

(57) ABSTRACT

In a drive mechanism for a windshield wiper, a switch disk for realizing a park position switch is supported so as to be independently rotatable relative to an output gear of a gear unit. The output gear and the switch disk are coupled with each other via a coupling device, with the coupling device acting as an engaging device carrying the switch disk along, in one direction of rotation only. In order to lower an axial dimension of the gear unit, the disk is rotatably supported on a sleeve, through which an output shaft extends so that the end of the shaft can support itself directly on a housing lid.

7 Claims, 2 Drawing Sheets

DRIVE DEVICE FOR A WINDSCREEN WIPER

TECHNICAL FIELD

This invention relates to a drive mechanism for a windshield wiper.

BACKGROUND OF THE INVENTION

Drive mechanisms for windshield wipers are provided with switches taking care of further supplying current to the motor of the drive mechanism, after the main switch has been opened by the driver, until the windshield wiper will again have reached its home position also referred to as park position. Correspondingly, the name of this switch is park position switch.

Usually, the park position switches are realised by a switch disk having a plurality of concentric contact paths which are sectionally interrupted and where, in each of the paths, a point-contact element is sliding, establishing an electrically conductive contact towards the contact path. Often, these contact paths are arranged fast on the output gear of the output shaft while the point contacts are formed on contact springs which are formed fast with the housing.

In this arrangement, where one element of the park position switch is connected fast with the output shaft, there are some problems.

Outside influences, such as snow on the windshield, may prevent the windshield wiper blade from reaching its park position. As, however, the output shaft will continue to be driven by the motor until it will have adopted an angular position which corresponds to the park position of the wiper blade, with the movement being unhindered, the wiper arm and wiper blade will be bent elastically as they support themselves on the obstacle. As soon as the motor automatically turns off, the relaxing wiper will cause the output shaft to be rotated back. In consequence, the park position switch will be closed again and current will be supplied to the motor. As a result, the wiper will again be moved against the obstacle and there will again be forming a mechanic stress. This operation will repeat itself until the obstacle has been removed. It is easy to see that, in this action, the gear unit is acted upon by considerable stresses reducing its service life.

Therefore, DE 36 06 891 A1 already suggested to connect one part of the park position switch to the output shaft via a coupling element instead of connecting it fast with the output shaft. In the Published Patent Application mentioned, the contact paths are arranged fast in the housing and the point-contact elements are rotatably supported and connected with the output shaft via a coupling device. However, this principle is also applicable if the point-contact elements are formed fast with the housing and the contact paths are formed on a switch disk rotatably supported in the housing. In this case, the switch disk is connected with the output shaft via a coupling element.

The coupling is of such a design that, in normal operation, when the wiper is driven to perform a pendulum movement, the output shaft will carry along the switch disk so that the park position switch works like a park position switch which is connected fast with the output shaft.

However, if there comes up the above-discussed case where the output shaft is reset, contrary to its actual direction of rotation, the switch disk will not be carried along so that the park position switch, which otherwise, again, would supply current to the motor, will not be closed.

In the Published Patent Application mentioned, the switch device features a design where the rotatable element is rotatably supported on a pivot connected with the housing lid, with the output shaft being axially supported on the front face of the pivot. The disadvantage of this arrangement is that, as compared with a conventional design, the axial extension of the gear housing is increased by at least the height of the housing pivot.

Therefore, in order lower an axial dimension of the housing, this invention suggests to support the rotatably supported switch element on a supporting sleeve formed on the housing lid and to have the output shaft extend into the sleeve.

This arrangement, moreover, is beneficial in that the output shaft can support itself on the housing lid directly. Belonging to the output shaft is also that part of the output gear which extends like a cap over the front face of the output shaft.

The housing lid consists of a base plate of metal, with the supporting sleeve being of plastic injection-moulded onto the metallic base plate. The part of the base plate whereon the output shaft is supported is kept free of plastic so that the axial forces will directly be introduced into the base plate which is directly fastened on the edge of the gear housing.

Provided on the outside of the base plate is a plastic layer wherein conductive tracks are extending via which the point contacts of the park position switch as well as the connected electric motor are supplied with current, and it is an obvious development to design the supporting sleeve and this plastic layer in one piece.

The rotatable switch element consists of an annular disk of plastic the inside edge of which rests on the outside surface of the supporting sleeve. Either the outside of the supporting sleeve or the inside contour of the annular disk may feature a polygonal design so that the supporting sleeve and the annular disk will touch each other only at certain points. Lubricant may be deposited in the clearances between these certain points of contact. The concentric contact paths are formed on the side of the annular disk which faces the lid.

The contact points are formed on contact springs approximately distributed evenly over the circumference of the contact disk so that the pressure applied by the contact springs to the annular disk will cause no tilting moment.

The contact springs are fastened to the bottom side of the plastic layer. To this end, the metallic base plate features appropriate oblong apertures whereby sections of the plastic layer are bared downwards. The contact springs are fastened to these bare spots and connected with the conductive tracks in the plastic layer.

At first, reference will be made to FIG. 1.

Figure 1:
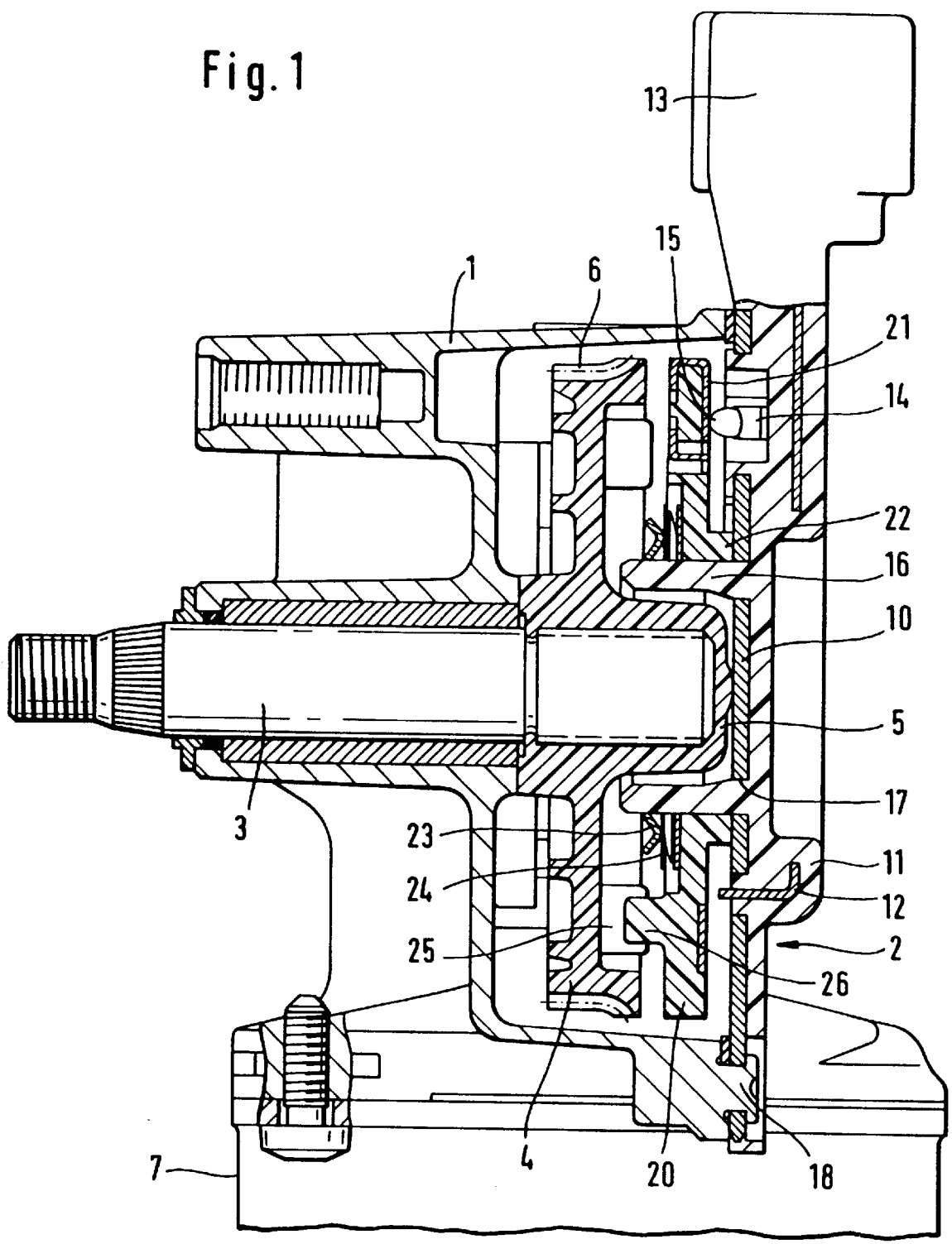
FIG. 1 is a cross-section through the gear unit.

FIG. 1 shows a cup-shaped housing 1 the open side of which is closed by a lid 2. An output shaft 3 extends through the bottom of the housing 1. Fastened to the end of the output shaft 3, which extends into the housing 1 is a gear 4 of plastic. The gear 4 has a cap-like portion 5, which extends across the front face of the shaft 3, which extends into the housing. The radial extension of the gear 4 approximately corresponds to the inside diameter of the housing 1. The outside toothing 6 of the gear is in mesh with a worm not represented here and formed in direct prolongation of the armature shaft of the motor 7 likewise not represented.

The lid 2 consists of a base plate 10 and of a plastic layer 11 essentially extending on the outside of the base plate 10. Arranged in this plastic layer are flat conductive tracks 12, which are connected with a plug 13, on the one hand, and with contact springs 14, on the other hand, out of, which one spring is represented in FIG. 1. On their ends, the contact springs 14 carry a point contact 15 cooperating with the contact paths on the contact disk 20. The plastic layer 11 is followed by a supporting sleeve 16 extending axially into the inside of the gear housing 1. The connection between the plastic layer and the supporting sleeve 16 is made through a plurality of apertures 17 in the base plate 10, which are evenly distributed over a circle in correspondence with the diameter of the supporting sleeve 16.

The end of the supporting sleeve 16 which faces the lid, is confined by the base plate 10.

The end of the shaft 3 projects into the space formed by the sleeve and the base plate 10 and is covered by a cap-like portion of the gear 4. The front side of this cap features an elevation supported on the base plate 10. In this way, the axial forces acting on the shaft 3 are introduced directly into the base plate 10 which, in its edge area, is directly connected with the housing 1 by means of screws or rivets 18.

The switch disk 20 is formed by an annular disk slipped onto the outside of the supporting sleeve 16, with the inside diameter of the annular disk essentially corresponding to the outside diameter of the supporting sleeve 16. Fixed on the surface of the annular disk 20, which faces the lid, are conductive contact paths 21. An annular collar 22 is formed on the annular disk. This annular collar 22 is rested against the base plate and thus forms an axial stop for the annular disk.

The annular disk 20 is fixed on the supporting sleeve 16 by means of a clamping ring 23, while a resiliently elastic corrugated ring 24 and a collar are arranged between the clamping ring 23 and the switch disk 20.

The inside edge of the switch disk 20 has the contour of a polygon, with the flat connecting sides between the corners lying tangentially against the cylindrical outside surface of the sleeve. The clearances formed in the corners serve to receive lubricant.

In order to couple the gear 6 and the switch disk 20, both the gear 4 and the switch disk 20 are each provided with an elevation 25, 26 which both extend axially and rest with one side surface each against each other, with the elevation 26 of the switch disk being able to move in a direction of rotation, away from the elevation 25 of the gear 4.

Figure 2:
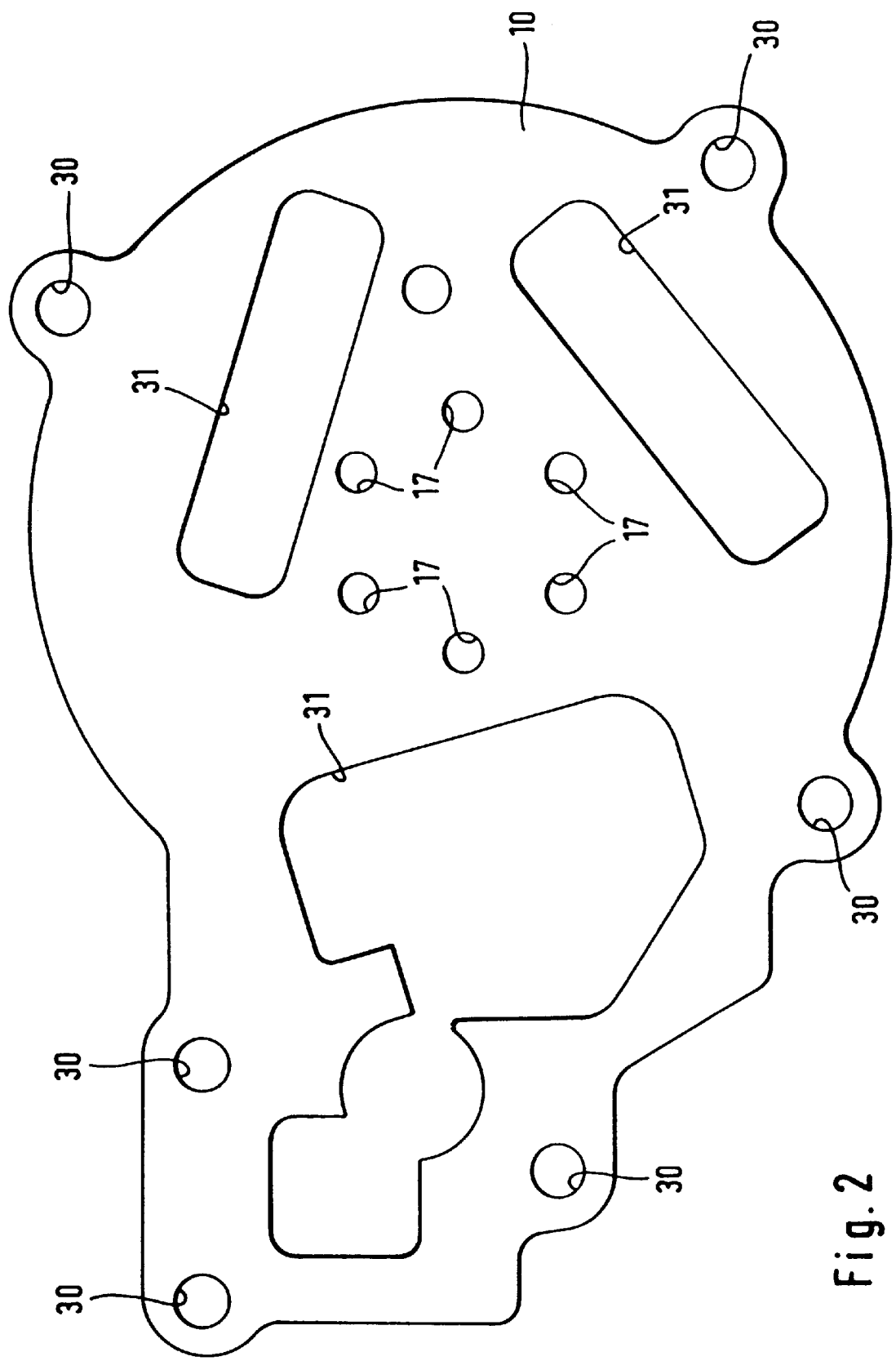
FIG. 2 is a top view on the metallic base plate of the gear housing lid.

FIG. 2 shows the base plate 10 of the lid 2. On its outside edge, the base plate 10 is provided with a plurality of apertures 30 serving as holes for screws or rivets for connecting the base plate 10 with the edge of the housing 1. Discernible in the centre of the base plate 10 is a circle of six apertures 17, which, as already explained, serve to allow the plastic mass which forms the supporting sleeve 16, to pass through during the process of injection moulding, so that a close connection will be formed between the sleeve and the plastic layer.

Slots 31 extending along the tangential direction are provided around the centre. In the area of the slots, the plastic layer is bare so as to permit the tongues 14 to be fastened there, on the free ends of these contact springs the contact points 15 being arranged, while simultaneously an electrically conductive contact is established towards the conductive tracks in the plastic layer.

What is claimed is:

1. A drive mechanism for a windshield wiper, comprising:
    a drive shaft and a driving gear, which are arranged in a housing closed by a lid,
    a drive-shaft-actuatable switch device for a park position switch, which is provided with rotatably supported first contacts movable by means of the drive shaft in such a way that the first contacts are carried along upon a rotation of the drive shaft in one direction and the first contacts are not carried alone when the drive shaft rotates in another direction, and with second contacts arranged fixedly with the housing, wherein the housing lid includes a supporting sleeve for supporting the rotatably supported first contacts and wherein the drive shaft extends into the supporting sleeve.

2. A drive mechanism as claimed in claim 1, wherein the lid is provided with a metallic base plate, and the drive shaft supports itself on the base plate.

3. A drive mechanism as claimed in claim 2, further including a plastic layer provided on the outside of the base plate, electrically conductive metal tracks being arranged in the plastic layer.

4. A drive mechanism as claimed in claim 3, wherein the supporting sleeve and the plastic layer are made in one piece.

5. A drive mechanism as claimed in claim 1, wherein the first contacts are arranged on a disk slipped onto the supporting sleeve and in that the rotatable contacts are made as contact paths on the disk.

6. A drive mechanism as claimed in claim 5, wherein outside of the supporting sleeve or the inside contour of the disk is made as a polygon so that the supporting sleeve and the disk touch each other only at points, clearances between the points serving to receive lubricant.

7. A drive mechanism as claimed in claim 1, wherein the base plate is provided with apertures, and on the bottom side of the plastic layer, which projects respectively across or into the apertures, contact springs are arranged connected with the conductive tracks in the plastic layer in an electrically conductive manner.

* * * * *